United States Patent [19]

Takahashi et al.

[11] Patent Number: 4,991,224
[45] Date of Patent: Feb. 5, 1991

[54] APPARATUS AND METHOD FOR LABELING CONNECTED COMPONENT IN A THREE-DIMENSIONAL IMAGE

[75] Inventors: Kazushige Takahashi, Yokohama; Nobuo Sawada, Atsugi, both of Japan

[73] Assignee: Kabushiki Kaisha Toshiba, Kanagawa, Japan

[21] Appl. No.: 425,400

[22] Filed: Oct. 19, 1989

Related U.S. Application Data

[63] Continuation of Ser. No. 72,046, Jul. 10, 1987, abandoned.

[30] Foreign Application Priority Data

Sep. 3, 1986 [JP] Japan .................. 61-207196

[51] Int. Cl.⁵ .............................................. G06K 9/46
[52] U.S. Cl. .......................................... 382/26; 382/20; 382/25
[58] Field of Search ................. 382/6, 9, 16, 26, 27, 382/25, 20, 45, 48; 364/518, 521; 377/10, 11

[56] References Cited

U.S. PATENT DOCUMENTS

| | | | |
|---|---|---|---|
| 3,571,796 | 5/1968 | Brugger | 382/20 |
| 4,334,274 | 6/1982 | Agui | 382/9 |
| 4,404,684 | 9/1983 | Takada | 382/25 |
| 4,412,121 | 10/1983 | Kremers | 356/376 |
| 4,624,013 | 11/1986 | Urushibata | 382/48 |
| 4,751,643 | 6/1988 | Lorensen et al. | 382/27 |
| 4,791,567 | 12/1988 | Cline et al. | 382/27 |

FOREIGN PATENT DOCUMENTS 0218166  10/1985  Japan .................. 382/9

Primary Examiner—Leo H. Boudreau
Assistant Examiner—Jose L. Couso
Attorney, Agent, or Firm—Finnegan, Henderson, Farabow, Garrett and Dunner

[57] ABSTRACT

An apparatus for labeling three-dimensionally connected components in a three-dimensional image is provided. The apparatus includes a two-dimensional labeling processor which labels each connected component in two-dimensional images giving a proper component code, and a coordinate calculator which calculates coordinates of a representative point representing each connected component. The apparatus further includes a connectivity detection processor which checks connectivity of representative points in adjacent two-dimensional image planes and an editing processor which modifies the component codes already provided by the two-dimensional labeling processor using the connectivity information to obtain three-dimensionally labeled image codes.

10 Claims, 9 Drawing Sheets

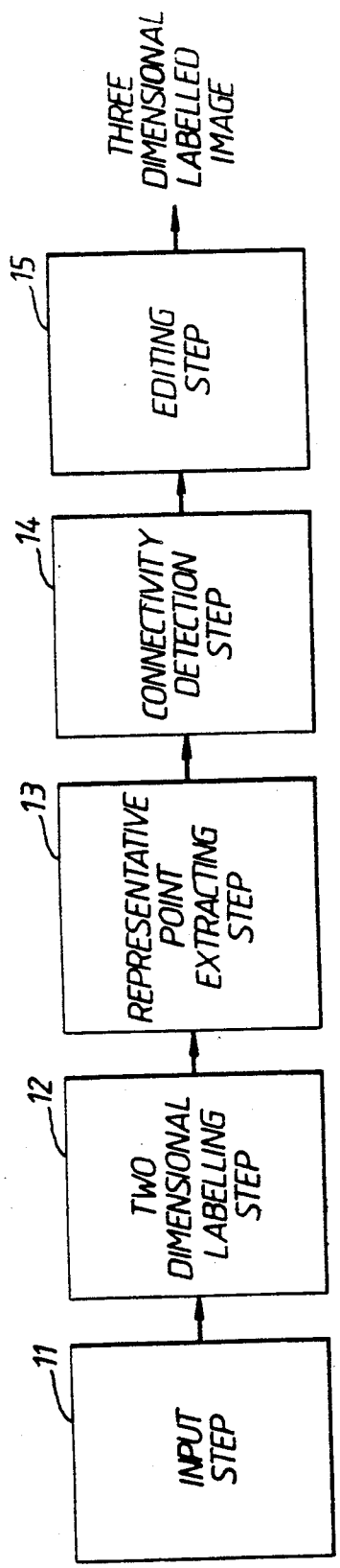
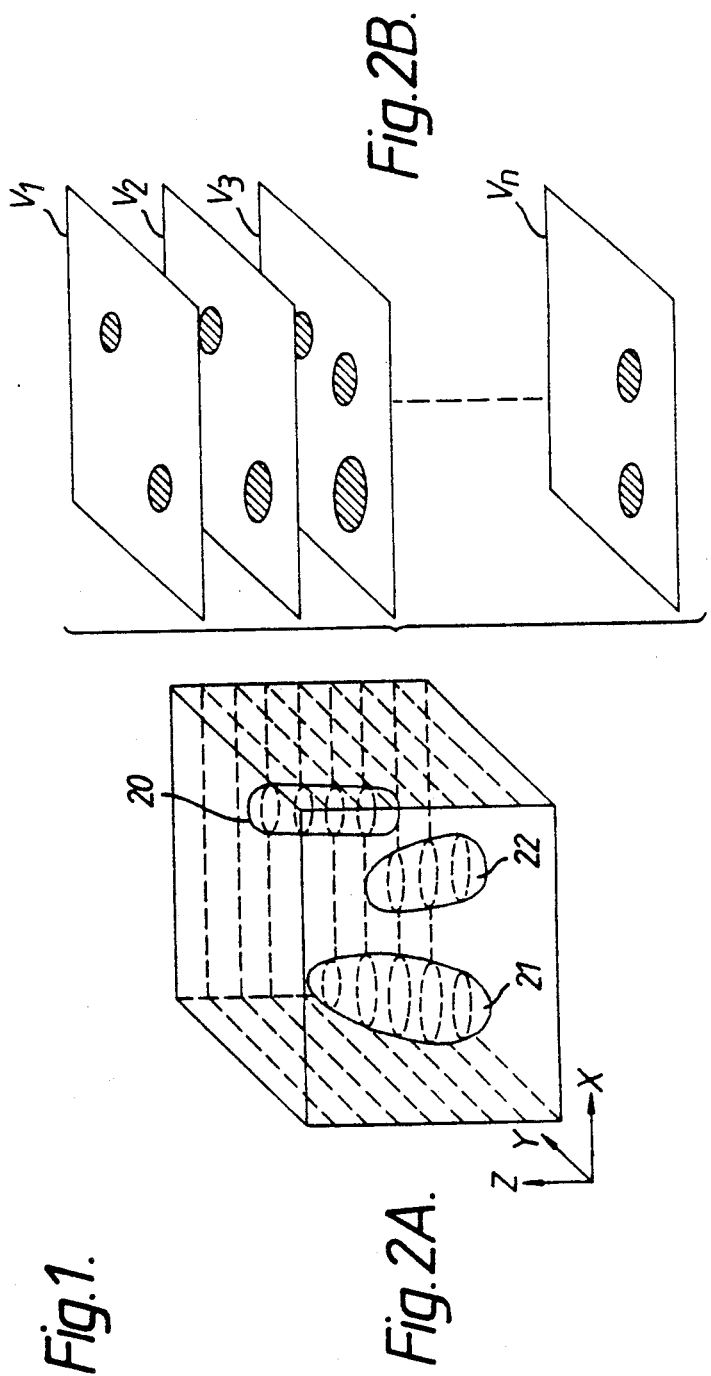
Fig. 1.
Fig. 2A.
Fig. 2B.

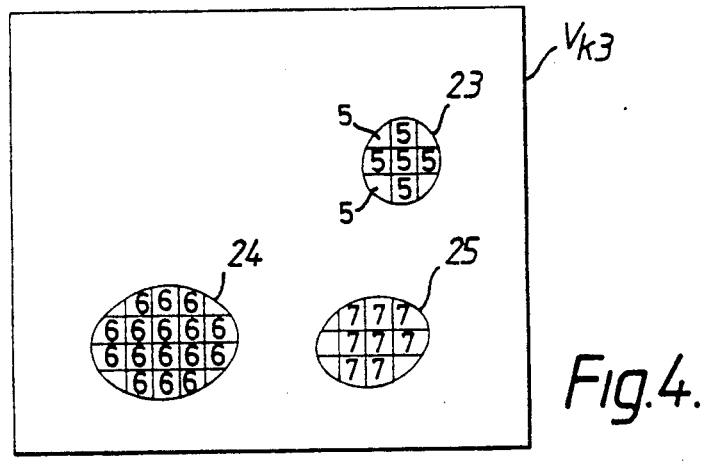
Fig.4.
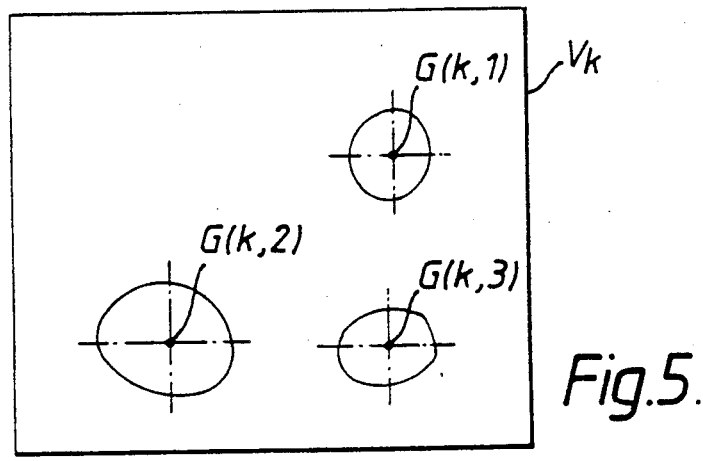
Fig.5.
| 2D IMAGE No. | G POINTS | | | G(k,m) |
|---|---|---|---|---|
| 1 | X1,Y1 | X2,Y2 | | ---- |
| 2 | X3,Y3 | X4,Y4 | | ---- |
| 3 | X5,Y5 | X6,Y6 | X7,Y7 | ---- |
| 4 | X8,Y8 | X9,Y9 | X10,Y10 | ---- |
Fig.6.

| 2D-IMAGE NUMBER | 2-DIMENSIONAL COMPONENT CODE | CONNECTED COMPONENT CODE | 3-DIMENSIONAL COMPONENT CODE |
|---|---|---|---|
| IN | CC | CN | CX |
| 1 | 1 | 3 | 0 |
| 1 | 2 | 4 | 0 |
| 2 | 3 | 5 | 0 |
| 2 | 4 | 6 | 0 |
| 3 | 5 | 8 | 0 |
| 3 | 6 | 9 | 0 |
| 3 | 7 | 10 | 0 |
| 4 | 8 | 0 | 0 |
| 4 | 9 | 11 | 0 |
| 4 | 10 | 12 | 0 |
| 5 | 11 | 0 | 0 |
| 5 | 12 | 0 | 0 |

*Fig.9A.*

| IN | CC | CN | CX |
|---|---|---|---|
| 1 | 1 | 3 | 1 |
| 1 | 2 | 4 | 2 |
| 2 | 3 | 5 | 1 |
| 2 | 4 | 6 | 2 |
| 3 | 5 | 8 | 1 |
| 3 | 6 | 9 | 2 |
| 3 | 7 | 10 | 7 |
| 4 | 8 | 0 | 1 |
| 4 | 9 | 11 | 2 |
| 4 | 10 | 12 | 7 |
| 5 | 11 | 0 | 2 |
| 5 | 12 | 0 | 7 |

*Fig.9B.*

APPARATUS AND METHOD FOR LABELING CONNECTED COMPONENT IN A THREE-DIMENSIONAL IMAGE

This application is a continuation, of application Ser. No. 07/072,046, filed Jul. 10, 1987, now abandoned.

FIELD OF THE INVENTION

This invention relates to an apparatus and method for image processing of a three-dimensional image, and more particularly relates to an apparatus and a method for labeling connected components in a three-dimensional image.

BACKGROUND OF THE INVENTION

In an industrial measuring system or a medical imaging system, such as an X-ray Computerized Scanner or a Magnetic Resonance Imaging (MRI) Scanner, it is necessary to distinguish three-dimensional objects from each other or to separate the three-dimensional objects so they can be accurately counted. It is well-known to separate two-dimensional connected components by a "labeling process" used in a conventional two-dimensional image processor. In the labeling process, each pixel must be two-dimensionally checked to determine if it is connected to adjacent pixels, all belonging to the same connected component. If the pixel is determined to be connected to an already identified component, it is labeled with the same component number given to that component. If the pixel is determined not to be connected to an already identified component, it is given or labeled with a new component number. After all pixels in an image are checked, a new image whose connected components are labeled is obtained. Such a labeling process is described, for example, in Chapter 9.1.3 entitled *Component Labeling and Counting* in the book by Azriel Rosenfeld and Avimash C. Kak, "Digital Picture Processing."

For separating and distinguishing three-dimensional objects in a three-dimensional image, a three-dimensional labeling technique was developed as described in T. Yonekura et al. in "Connectivity and Euler Number of Figures in the Digitized Three-Dimensional Space", Japanese Electronics and Communication Association Papers (D), J65-D, 1, pp. 1-24 (1981). However, the technique is merely an extension of the two-dimensional labeling technique applied to a three-dimensional image. Each pixel is also three-dimensionally checked to determine if it is connected to pixels identified with other connected components. Thus, it requires a large number of calculations and much time to accomplish three-dimensional labeling using this method.

SUMMARY OF THE INVENTION

It is the object of this invention to provide an apparatus and a method for labeling connected components in a three-dimensional image which is capable of labeling connected components with a new and improved three-dimensional labeling process.

It is another object of this invention to provide an apparatus and a method for labeling connected components in a three-dimensional image which reduces the amount of calculation and time for labeling objects or components of a three-dimensional image using this method.

According to the present invention, there is provided an apparatus for labeling connected components in a three-dimensional image, comprising means for inputting a plurality of two-dimensional images of a three-dimensional image; first labeling means, coupled to the input means, for two-dimensionally labeling connected components in each two-dimensional image and for generating labeled two-dimensional images in which each connected component is given an independent component code; image memory means coupled to the first labeling means for storing the labeled two-dimensional images; and second labeling means, coupled to the first labeling means, for three-dimensionally labeling each connected component in the three-dimensional image.

The second labeling means includes means for calculating the coordinates of representative points for the connected components in each two-dimensional image, means for detecting the connectivities of the representative points of the connected components between adjacent two-dimensional images by comparing the coordinates of the representative points, and editing means coupled to the image memory means for modifying the component code of each connected component in labeled two-dimensional images in accordance with the connectivities detected by said detection means.

Thus, using the apparatus according to the present invention it is unnecessary to check the connectivity of each pixel in the three-dimensional image. Rather only the connectivity of the representative points of the connected components is determined so that the calculation time for the three-dimensional labeling process is greatly reduced.

BRIEF DESCRIPTION OF THE DRAWINGS

FIG. 1 shows a general flow chart of the three-dimensional labeling process according to the invention;

FIG. 2A shows an example of a three-dimensional image;

FIG. 2B shows an example of sliced two-dimensional images obtained from the three-dimensional image shown in FIG. 2A;

FIG. 4 shows an example of a labeled two-dimensional image;

FIG. 5 shows an illustration for explaining representative points for connected components in a two-dimensional image;

FIG. 6 shows an example of the content of the coordinate memory of FIG. 3 for storing coordinates of representative points;

FIG. 9A shows an example of the contents of the connectivity memory of FIG. 3 being written by the connectivity detection processor;

FIG. 9B shows an example of the contents of the connectivity memory of FIG. 3 being written by the editing processor;

DETAILED DESCRIPTION OF THE PREFERRED EMBODIMENT

FIG. 1 shows a general flow chart of the three-dimensional labeling method according to the present invention. The method includes an input step 11 for inputting a plurality of sliced two-dimensional images of a three-dimensional image which includes objects which are to be distinguished from each other. Objects as used in this context can include concave surfaces, such as cracks or openings in a manufactured item. As an example of a three-dimensional image (hereinafter called 3D image), three objects 20, 21 and 22 are shown in FIG. 2A. FIG. 2B shows a plurality of sliced two-dimensional images (hereinafter called 2D images) $V_1$, $V_2, \ldots, V_n$, being parallel to each other, which are obtained from the 3D image shown in FIG. 2A.

The next stage shown in FIG. 1 is a two-dimensional labeling step 12 for labeling connected components contained in each of 2D images $V_1, V_2, \ldots, V_n$. Each connected component of a 2D image is given a proper component code, such as a sequential number, in the order of scanning the 2D images.

Then, representative points (hereinafter called G points) are calculated in a representative point extracting step 13. Each G point represents a center of gravity or geometric center of the corresponding connected component in the 2D image.

A connectivity detecting step 14 and an editing step 15 are then provided to complete the three-dimensional labeling process. In the connectivity detecting step 14, G points in a sliced 2D image and G points in the adjacent sliced 2D image are compared to generate connectivity information for connected components in 2D images. According to the connectivity information, the component codes of labeled 2D images are modified or re-labeled in the editing process 15 to obtain a three-dimensionally labeled image in which the 2D slices through the same object are labeled with the same code.

Figure 3:
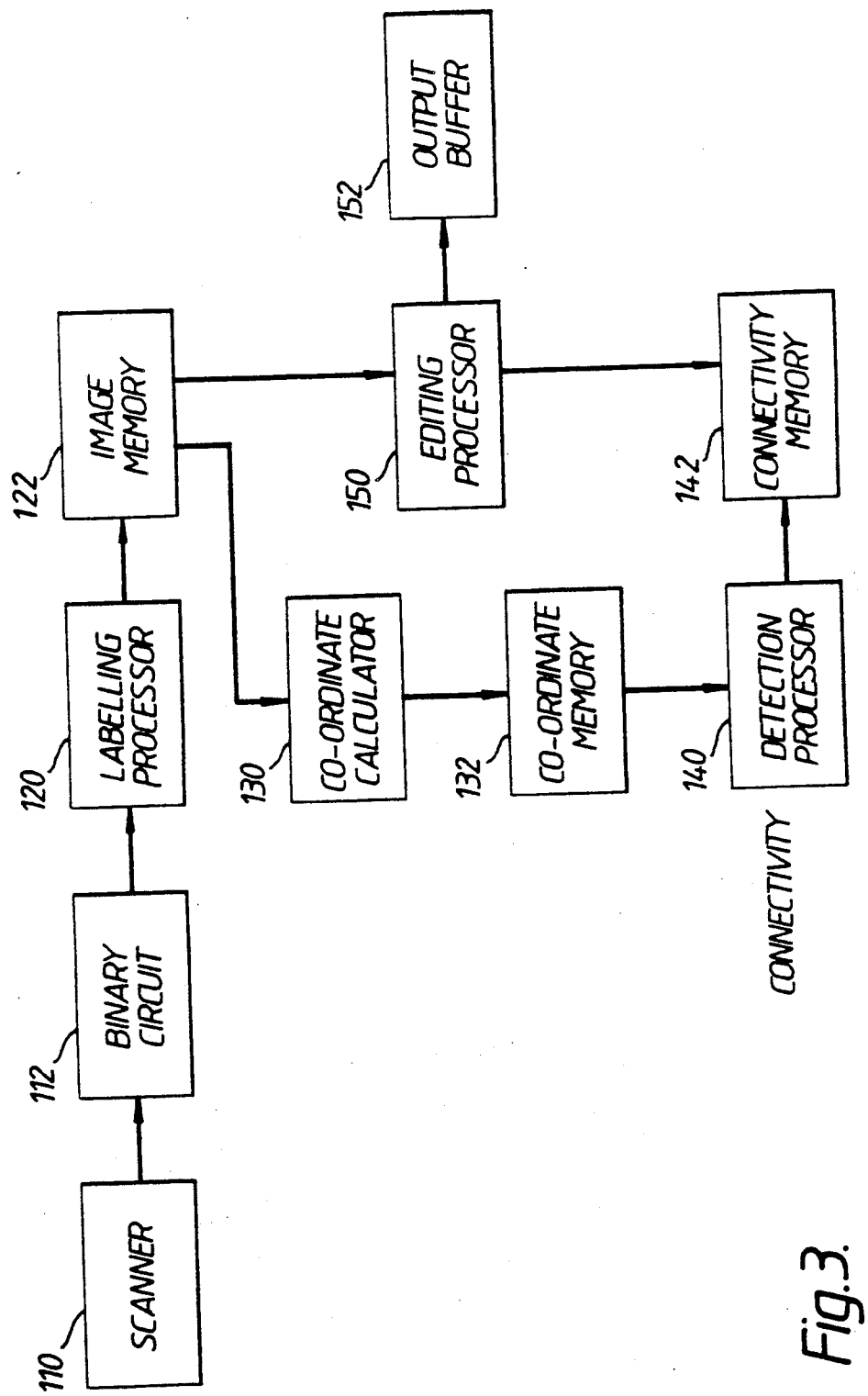
FIG. 3 shows a block diagram of the preferred embodiment according to the invention.

FIG. 3 shows a block diagram of the preferred embodiment of the invention. Scanner 110, which for instance may be an X-ray Computerized Tomography (CAT) scanner, an ultrasonic wave scanner, or a Magnetic Resonance Imaging (MRI) scanner, inputs a plurality of sliced 2D images of human bodies or industrial parts depending on the application. Each 2D image is supplied to a binary circuit 112 which transforms each pixel having multivalue or gray level of a 2D image into a pixel having binary states of "0" (background area) and "1" (object area). If the 3D image is already stored in a memory file, the image may be divided along the z-axis direction (FIG. 2A) into a plurality of 2D image planes (FIG. 2B) and supplied directly to binary circuit 112. In this case, the input is taken directly from the stored file and not from the scanner.

A labeling processor 120 is provided for two-dimensionally labeling each connected component of the binary 2D images. Such two-dimensional labeling is known in two-dimensional imaging technology. Each binary 2D image is supplied to labeling processor 120, which has, for example, a 2×2 matrix shift register (not shown) for storing neighboring pixels next to each other. Each pixel data of the 2D image is sequentially provided to the 2×2 matrix shift register. A pixel being operated on is stored in a lower-right location of the 2×2 matrix shift register and checked to determine if it is connected to the other neighboring 3 pixels (upper, upper-left and left locations of the matrix). Two-dimensional connectivity can be checked as follows:

(a) if all of the neighboring 3 pixels are "0" (background area) and the pixel of interest is "1", a new component number is given to the pixel of interest.

(b) if one of neighboring 3 pixels is "1" (object area) and the pixel of interest is "1", the pixel of interest is replaced by the same component number which is already given to the neighboring pixels.

(c) if the pixel of interest is "0", there is no need for processing.

Each pixel data of each 2D image is supplied sequentially to the above matrix shift register and checked as described above, so that labeling processor 120 outputs labeled 2D images wherein each connected component is labeled with a proper component code or label number. FIG. 4 shows an example of a labeled 2D image $V_k$ containing three connected components 23, 24 and 25. Connected components 23, 24, and 25 are labeled with numbers 5, 6, and 7, respectively. Thus, each pixel data of connected components is given as "5", "6", and "7" as shown in FIG. 4. The labeled 2D images are then stored in image memory 122.

Coordinate calculator 130 in FIG. 3 is provided for calculating the coordinates of G points G(k,1), G(k,2), and G(k,3) in the connected components shown in FIG. 5. Each labeled 2D image is supplied to coordinate calculator 130. Since each G point is a representative point of a connected component, it is preferably a geometric center or center of gravity of the connected components. One method for calculating the coordinates of the gravity center of the connected components is approximated by calculating the mean value of coordinates of contour (outline) pixels in a particular connected component. The other approximation is accomplished by calculating the mean value of coordinates of whole pixels of a particular connected component. Such a calculation is also known. In brief, it uses pixel-counters and G-registers (not shown) prepared for each connected component as follows:

(1) pixel data is read sequentially by counting its x and y coordinates in the 2D image;

(2) a pixel counter counts the pixels with corresponding data, i.e., the same component code;

(3) the coordinates corresponding to the pixel data are added to one of the G registers;

(4) steps (1) to (3) are repeated for all of the pixels in a 2D image;

(5) the content of the respective G registers is divided by the corresponding content of the pixel counters, thereby providing mean coordinate values of the whole pixels contained in each connected component. These mean values are stored into coordinate memory 132 as coordinates of the G points for each connected component. FIG. 6 shows an example of the content of the coordinate memory 132. G points of the 2D images are stored in correspondence with its image number k. For example, the second 2D image $V_2$ (k=2) has two connected components (having component codes 3 and 4) of which G points are (x3, y3) and (x4, y4). Hereinafter, the m-th G point in the k-th 2D image is referred to by G(k,m).

Connectivity detection processor 140 in FIG. 3 is provided for detecting the connectivity between a connected component in the k-th 2D image and connected components in the (k+1)-th 2D image using coordinates of G points G(k,m) and G(k+1,m') stored in coordinate memory 132.

Figure 7:
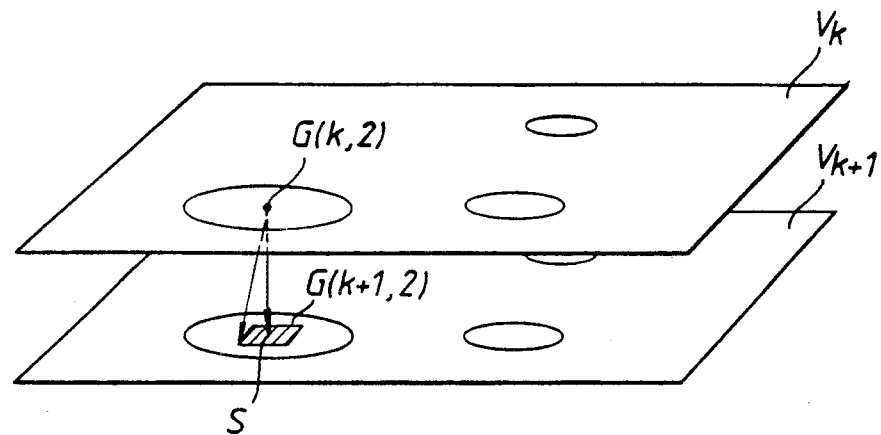
FIG. 7 shows an illustration for explaining the operation of the connectivity detection processor of FIG. 3.

FIG. 7 shows an illustration of the connectivity detection of connected components in different image planes. Each G point G(k,m) of the k-th 2D image $V_k$ is checked to determine if it and a G point G(k+1,m') of the (k+1)-th 2D image $V_{k+1}$ have coordinates inside of a certain area S, for example, a circle having a radius r. When the G points of the given components satisfy this condition, the pair of G points are written into connectivity memory 142.

Figure 8:
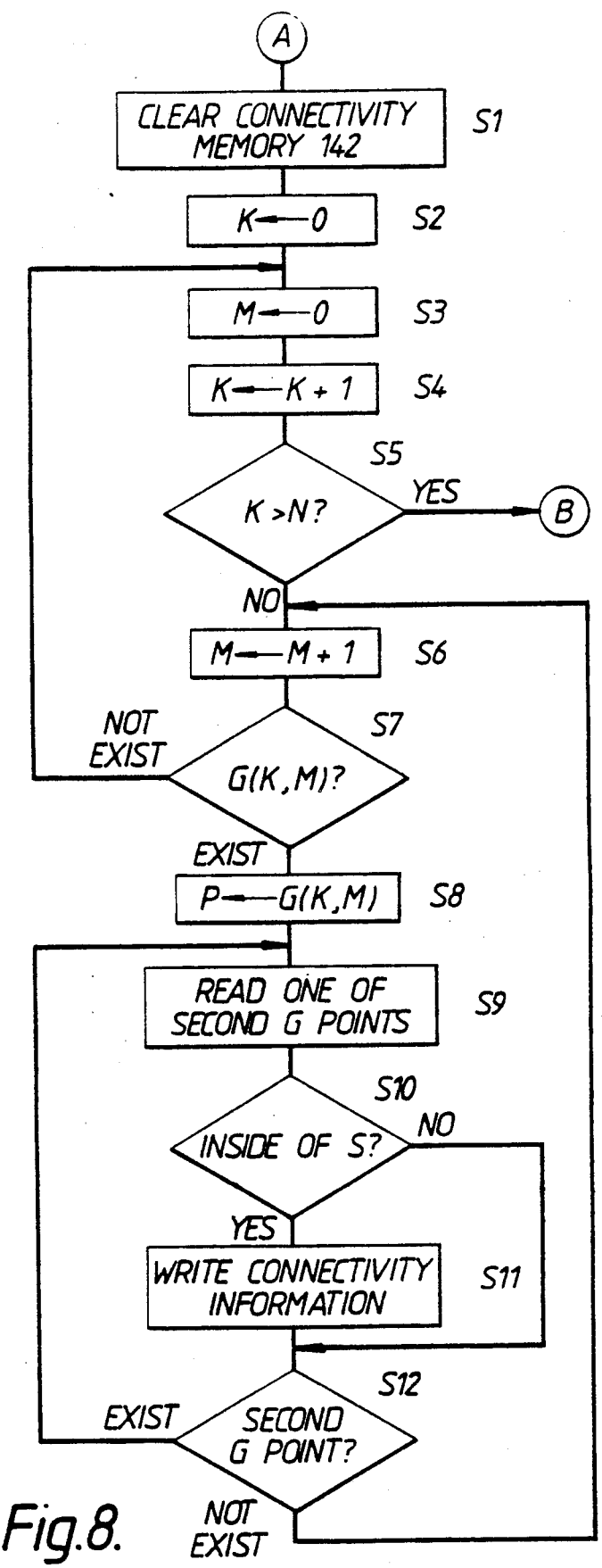
FIG. 8 shows a flow chart of the operation of the connectivity detection processor of FIG. 3.

FIG. 8 shows a flow chart of the operation of connectivity detection processor 140 and FIG. 9A shows an example of the contents of connectivity memory 142. Connectivity memory 142 stores a plurality of data for each connected component, including (a) a 2D image number (IN) in field IN, identifying the image plane, (b) its component code (CC) in field CC, (c) a component code or codes to which it connected in field CN, and (d) a new component code in field CX which comes from the three-dimensional labeling process. Although it is not shown in FIG. 9A, the number of pixels contained in a connected component derived by the pixel-counters of coordinate calculator 130 or other parameters relating to each two-dimensional connected component also be stored in connectivity memory 142. These parameters can be used in later processes for measuring the characteristics (such as volume) of threedimensional objects, after three-dimensional labeling according to the invention has been completed.

Referring now to the flow chart of FIG. 8, the operation of the connectivity processor 140 will be described. In step S1, all fields IN, CC, CN and CX of connectivity memory 142 are cleared. Then, k-counter is initialized to zero at step S2, and m-counter is initialized to zero at step S3. The contents of k-counter and m-counter represent a number identifying, respectively, a 2D image and one of the connected components in the identified 2D image. Both numbers are held in counters or registers (not shown) in connectivity detection processor 140. K-counter is incremented by one at step S4, and then the content of k-counter is compared with a preknown number N indicating the total number of 2D images at step S5. When the content of k-counter k is less than or equal to N, steps S6 through S12 are executed for generating connectivity information to be written into connectivity memory 142. Or, if k becomes larger than N, the detection process is ended and editing processor 150, described below, is activated.

At step S6 m-counter is incremented by one, and G point G(k,m) of m-th connected component in k-th 2D image is checked at step S7 to determine if such a G point G(k,m) designated by k-counter and m-counter in coordinate memory 132 exists. When coordinates of G point G(k,m) are stored in coordinate memory 132, the coordinates of G point (hereinafter called first G point) are read out and set in p-register (not shown) at step S8.

Processor 140 reads out one of the G points in a (k+1)-th 2D image at step S9. At step S10 the G point in the (k+1)-th 2D image (hereinafter called second G point) is checked to determine if it is within the predetermined area S. Such checking is available, for example, by calculating the distance the first G point is shifted with respect to the second G point. If the coordinates of the p-register (first G point) in the k-th 2D image are xp and yp and the coordinates of the second G point in the (k+1)-th 2D image are x and y, the distance is calculated as:

$$d = \sqrt{(xp - x)^2 + (yp - y)^2}$$

Thus, if d is smaller than the radius r of the area S, the connectivity information is written into connectivity memory 142 at step S11. The connectivity information according to the embodiment includes the number k of 2D image, i.e., the content of k-counter being stored in field IN, the component code corresponding to the first G point in the k-th 2D image being stored in field CC, the component code corresponding to the second G point in the (k+1)-th 2D image being stored in field CN. If d is larger than the radius r, step S11 is skipped. The steps S9 through S11 are repeated for all of G points in the (k+1)-th 2D image. After all of them are checked at step S12, control returns to step S6 and repeats similar processing for the next G point in the k-th 2D image.

There is another way of checking to determine if the second G point is inside of the area S of the first G point at step S10. A simplified method, for example, is to calculate the absolute differences of the x and y coordinates as, $$dx = xp - x$$

$$dy = yp - y$$

If the differences dx and dy are within the threshold value representing several pixels of the k-th 2D image, it is determined that the connected component corresponding to the first G point and the connected component corresponding to the second G point are connected in the third dimension.

The connectivity data is read into memory as shown in FIG. 9A. For example, in the fifth row, the connected component having component code 5 in the third 2D image plane is connected to the connected component having component code 8, which is in the neighboring 2D image plane, i.e., the fourth 2D image.

Editing processor 150 in FIG. 3 is provided for generating a three-dimensionally labeled 3D image from the two-dimensionally labeled 2D images stored in image memory 122 according to the connectivity information of connectivity memory 142.

Figure 10A:
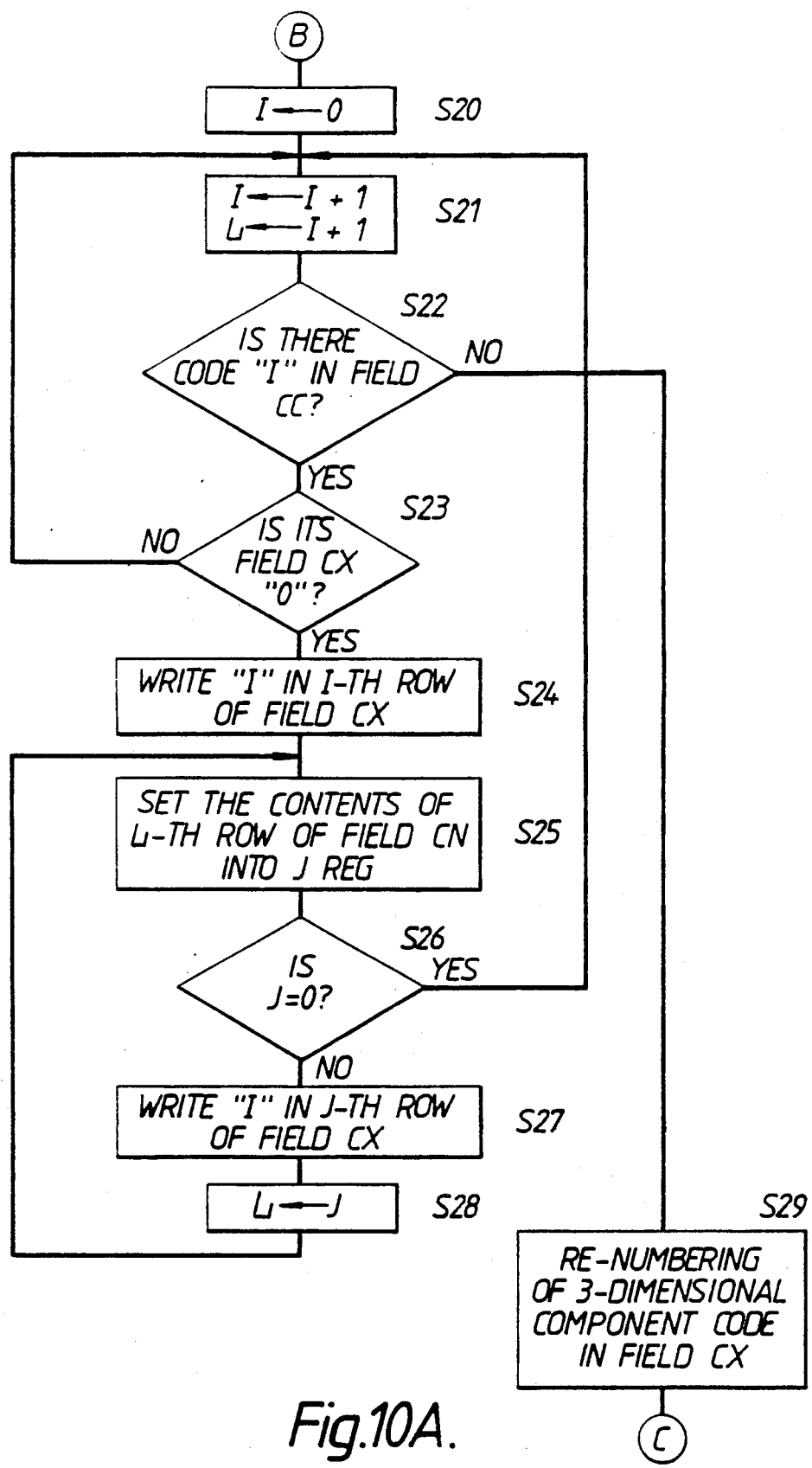
FIGS. 10A and 10B show flow charts of the operation of the editing processor of FIG. 3.
Figure 10B:
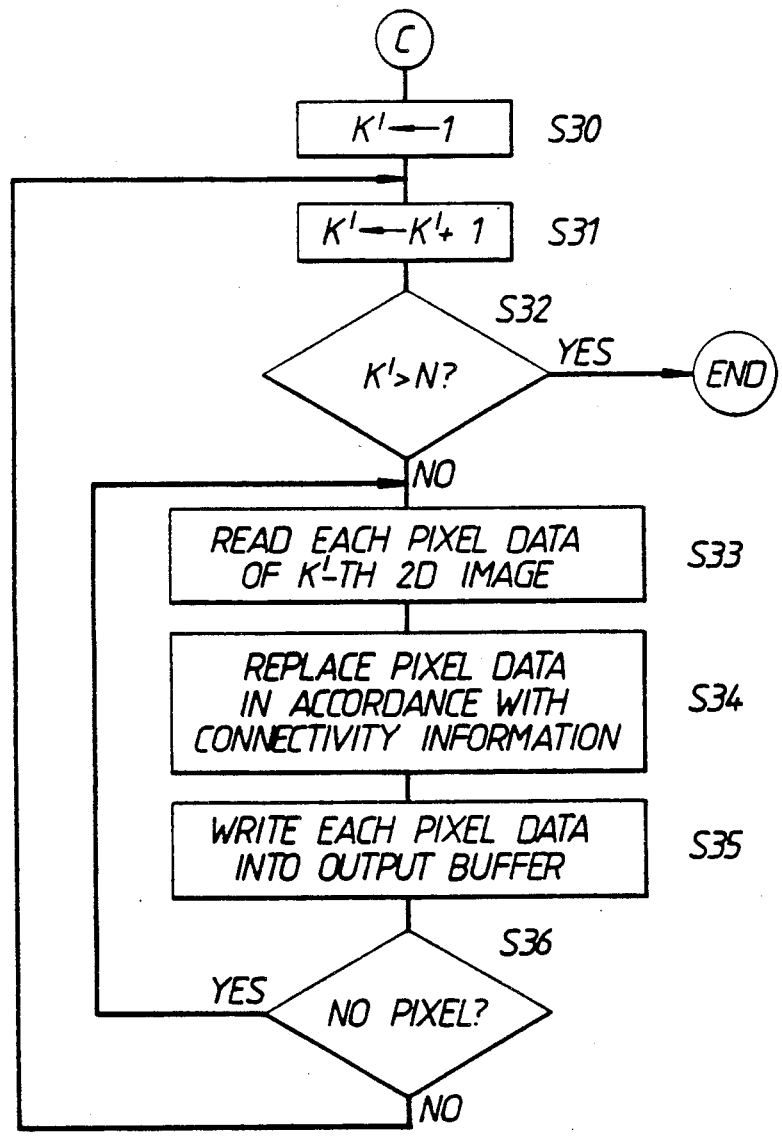

FIGS. 10A and 10B show flow charts of the operation of editing processor 150. The first stage of the operation is to determine the three-dimensional component codes from the connectivity information (FIG. 10A). The empty field CX of connectivity memory 142 in FIG. 9A must be filled with threedimensional component codes. The second stage of operation is to replace each pixel data of the 2D images to correspond to the three-dimensional component codes determined by the first stage (FIG. 10B).

In the first stage, i-counter (not shown) is cleared at step S20. The i-counter is incremented by 1 and 1-counter (not shown) is set to the same value of the i-counter at step S21. Then the processor searches field CC of connectivity memory 142 to find a component code "i" which matches the contents of i-counter. If there is "i" in field CC, its corresponding field CX (in the same row) is checked to see if it is "0" (initial value) or not at step S23. If the contents of field CX is not "0", the control returns to step S21, since the i-th row of the memory already has a three-dimensional code.

When the contents of field CX is "0", the processor writes "i" into its CX field as a three-dimensional code at step S24. Then, the contents of the 1-th row of field CN being indicated by 1-counter is set into j-register (not shown) at step S25. The contents of j-register is checked to see if it is "0" or not. If it is "0" the control returns to step S21 as there is no connected component.

If the contents of j-register are not "0", the processor writes "i" in the CX field of the jth row indicated by j-register at step S27 and the contents of j-register are written to 1-counter at step S28. Steps S25 through S28 are repeated for the other connected components which have no three-dimensional code. Each of the above registers i, 1, and j are not specifically shown but are part of editing processor 150.

When there is no code "i" in field CC at step S22, all of the connected components have been checked and field CX is filled with three-dimensional component codes, for example in FIG. 9B, the contents of the CX field will be renumbered at step S29. In the renumbering step S29, the three-dimensional component codes are renumbered to not skip numbers, as in FIG. 9B. For example, the contents of the CX field as shown in FIG. 9B, skip numbers "3", "4", "5", and "6". The numbers are renumbered by replacing "7" with "3". Such a renumbering step is not always necessary for labeling purposes, but is very useful for later measuring processes.

Figures 11A, 11B:
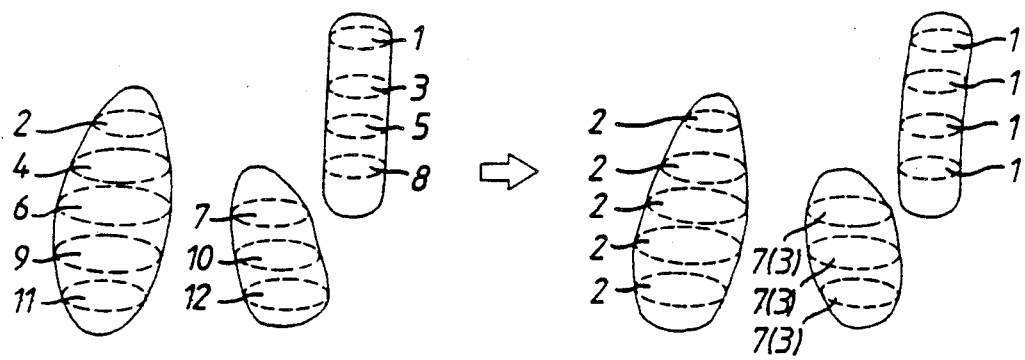
FIG. 11A shows an illustration of two-dimensionally labeled component codes for connected components.
FIG. 11B shows an illustration of three-dimensionally labeled component codes for connected components.

Thus, the two-dimensionally labeled connected components illustrated in FIG. 11A can be labeled with three-dimensional codes as illustrated in FIG. 11B.

FIG. 10B shows the second stage of the operation of editing processor 150. K'-counter (not shown) is initialized to 1 at step S30. Then k'-counter is incremented by one at step S31, which indicates the k'-th 2D image plane. The contents of k'-counter are compared with the total number of 2D images N at step S32 to see if it is larger. When the content of k'-counter is less than or equal to N, steps S33 through S36 are executed, otherwise the operation is ended.

The processor reads each pixel data of k'-th 2D image designated by k'-counter from image memory 122 at step S33. The pixel data is replaced in accordance with connectivity information at step S34, then each pixel data is written into output buffer 152. More specifically, if the pixel data is "0", i.e., background, the same value is written into output buffer. But if the pixel data is not "0", the processor refers to field CC of connectivity memory 142 as shown in FIG. 9B. When there is the same data in field CC, the pixel data is replaced by the contents of field CX of the same row in connectivity memory 142. For example, when the pixel data is "5", new pixel data is "1" according to the fifth row of FIG. 9B.

At step S36, it is determined if any pixels are remaining for k'-th 2D image, and if so, steps S33 through S36 are repeated. Thus, all the 2D images are three-dimensionally labeled and stored into output buffer 152.

In the aforementioned embodiment, representative points or G points are determined after two-dimensional labeling is completed. However, there is another method wherein the two-dimensional labeling and determining G points are executed alternately.

Figure 12:
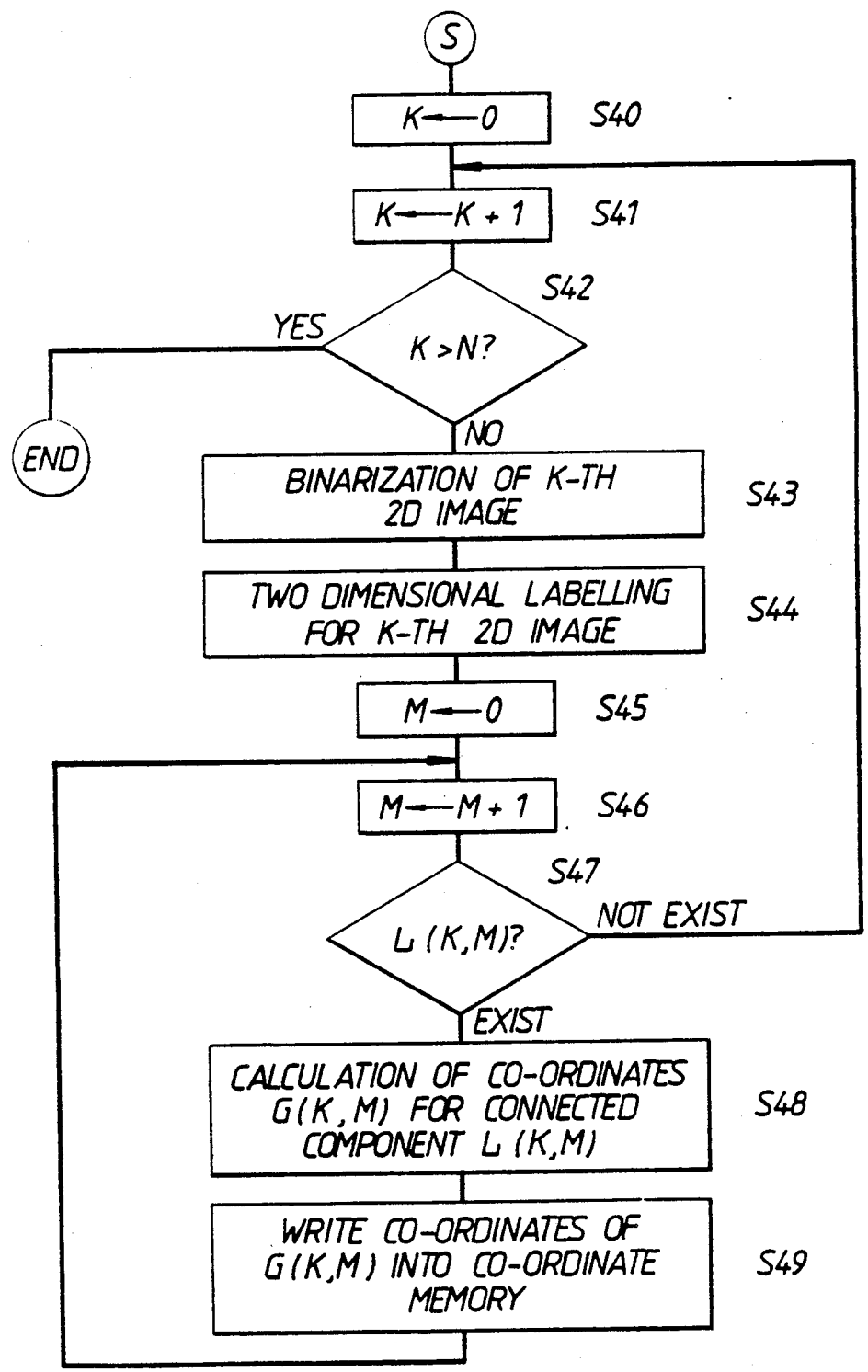
FIG. 12 shows a flow chart of the operation of a second preferred embodiment of this invention.

FIG. 12 shows a flow chart of another embodiment according to the invention which executes two-dimensional labeling and determination of G points alternately. At step S40, k-counter (not shown) is initialized to 0, and is incremented by 1 at step S41. The content of k-counter is compared with the total number of 2D images N at step S42. If k is less than or equal to N, steps S43 through S49 are executed, otherwise the operation will be ended.

At step S43, binarization of the input k-th image designated by k-counter is executed and then two-dimensional labeling for the k-th binarized 2D image is performed at step S44.

M-counter (not shown) is initialized to 0 at step S45 and then it is incremented by 1 at step S46. At step S47, the connected component is searched. If there is a connected component left in the labeled 2D image, G points are determined through steps S48 and S49. In step S48, the coordinates of the G point G(k,m) is calculated as is described above and then the calculated coordinates are written into coordinate memory 132. If there is no connected component left at step S47, the control returns to step S41 and repeats the same procedure for the other 2D images. The individual counters and registers have not been shown since their use is well known.

What is claimed is:

1. An apparatus for labeling connected components in a three-dimensional image, comprising:
   input means for inputting a plurality of two-dimensional image planes of the three-dimensional image;
   first labeling means, coupled to said input means, for labeling each two-dimensionally connected component in each twodimensional image plane, each two-dimensionally connected component including a plurality of pixels, and for generating labeled two-dimensional images in which each connected component is given an independent component code;
   image memory means, coupled to the first labeling means, for storing said labeled two-dimensional images; and
   second labeling means, coupled to the first labeling means, for three-dimensionally labeling each connected component in said three dimensional image, said second labeling means including:
   calculation means for determining a number of representative points for each of said connected components in each two-dimensional plane, said number of representative points being substantially less than the plurality of pixels in a component, and said representative points denoted by coordinates,
   detection means for detecting connectivities of the representative points of the connected components between adjacent two-dimensional image planes by comparing the coordinates of said representative points, and
   editing means, coupled to said image memory means, for modifying the component code of each connected component in labeled two-dimensional image planes in accordance with the connectivities detected by said detection means.

2. The apparatus according to claim 1, wherein said second labeling means further includes:
   coordinate memory means for storing coordinates of the representative points detected by said calculation means, and
   connectivity memory means for storing connectivity information derived by said detection means.

3. The apparatus according to claim 2, wherein said connectivity memory means stores at least pairs of connected component codes which are detected as having connectivity to each other by said detection means.

4. The apparatus according to claim 2, wherein said editing means includes:
   first means for determining three-dimensionally labeled component codes for each connected component from the connectivity information stored in said connectivity memory means, and
   second means coupled to said image memory means for replacing the two-dimensionally labeled component codes by the three-dimensionally labeled component codes determined by said first means.

5. A method for labeling connected components in a three-dimensional image, comprising the steps of:
   (a) inputting a plurality of two-dimensional image planes of three-dimensional objects;
   (b) two-dimensionally labeling each two-dimensionally connected component in each two-dimensionally image plane, wherein each connected component is given a different component code, and wherein each connected component includes a plurality of pixels;
   (c) calculating coordinates of exactly one representative point for each connected component;
   (d) detecting connectivity information of connected components in adjacent two-dimensional image planes by comparing coordinates of the representative points corresponding to the adjacent two-dimensional image planes; and
   (e) modifying the component codes of connected components in accordance with the connectivity information.

6. The method according to claim 5, wherein step (d) comprises the steps of:
   reading out coordinates corresponding to one of the representative points included in a two-dimensional image plane as a first representative point;
   reading out coordinates corresponding to one of the representative points included in an adjacent two-dimensional image plane as a second representative point; and
   judging the connectivity of said first and second representative points by comparing their coordinates.

7. A method for labeling connected components in a three-dimensional image, comprising the steps of:
   (a) inputting a first two-dimensional image plane of three-dimensional objects;
   (b) labeling each two-dimensionally connected components in the two-dimensional image plane being inputted by step (a), wherein each connected component is given a different component code, and wherein each connected component includes a plurality of pixels;
   (c) calculating coordinates of a representative point for each connected component in a coordinate memory;
   (d) storing the coordinates of the representative point for each connected component in a coordinate memory;
   (e) repeating steps (a) through (d) for every twodimensional image plane of the three-dimensional objects;
   (f) detecting connectivity information of connected components in adjacent two-dimensional image planes by comparing coordinates of the representative points stored in the coordinate memory corresponding to the adjacent two-dimensional image planes; and
   (g) modifying component codes of connected components in accordance with the connectivity information to replace the two-dimensionally labeled component codes by three-dimensionally labeled component codes.

8. The apparatus according to claim 1 wherein said calculation means determines one representative point for each of said connected components, each of said representative points corresponding to one of said connected components.

9. The apparatus according to claim 8 where each of said representative points is a center of gravity of the corresponding connected component.

10. The apparatus according to claim 8 where each representative point is a geometric center of the corresponding connected component.

* * * * *